United States Patent [19]

Koto

[11] Patent Number: 4,502,058

[45] Date of Patent: Feb. 26, 1985

[54] LOW VOLTAGE INK-JET PRINTHEAD

[75] Inventor: Haruhiko Koto, Shiojiri, Japan

[73] Assignee: Shinshu Seiki Kabushiki Kabushiki Kaisha Suwa Seikosha, Japan

[21] Appl. No.: 393,971

[22] Filed: Jun. 30, 1982

[30] Foreign Application Priority Data

Jul. 2, 1981 [JP] Japan ................................ 56-104287

[51] Int. Cl.[3] ............................................ G01D 15/18

[52] U.S. Cl. ................................................ 346/140 R

[58] Field of Search .................................. 346/140 R

[56] References Cited

U.S. PATENT DOCUMENTS

| | | | |
|---|---|---|---|
| 4,333,087 | 6/1982 | Yamaguti | 346/140 R |
| 4,353,078 | 10/1982 | Lee et al. | 346/140 R |
| 4,364,067 | 12/1982 | Koto et al. | 346/140 R |
| 4,443,807 | 4/1984 | Koto | 346/140 R |

OTHER PUBLICATIONS

'Design of an Impulse Ink Jet,' Kyser et al., *Journal of Applied Photographic Fn* 6'6, vol. 7, 3, 6181.

The Piezoelectric Capillary Injector—A New Hydrodynamic Method For Dot Pattern Generation, IEEEE Transactions on Electron Devices, vol. ed. 20, No. 1, Jan. 1973.

Model For Fluid Ejection and Refill in an Impulse Drive Jet, Society of Photographic Scientists and Engineers 1977.

*Primary Examiner*—E. A. Golddberg
*Assistant Examiner*—Gerald E. Preston
*Attorney, Agent, or Firm*—Blum, Kaplan, Friedman, Silberman & Beran

[57] ABSTRACT

An ink-jet printer comprises a piezoelectric element, a pressurization chamber coupled to the piezoelectric element for containing ink therein, and a nozzle communicating with the pressurization chamber, the piezoelectric element being deformable upon application of a drive voltage V to change the volume of the pressurization chamber for ejecting ink from the nozzle. The vibratory system including the piezoelectric element has an acoustic capacitance Co selected with respect to the flow passage system including said nozzle, said pressurization chamber and an ink supply passage, so as to minimize the drive voltage V. Drive voltage is related to the capacitance Co, electrical capacitance cp of the piezoelectric element and pressure ψ as follows:

$$V = \sqrt{\frac{2\,\psi^2 Co}{K^2 cp}}$$

K is a constant.

13 Claims, 19 Drawing Figures

FIG. 3a
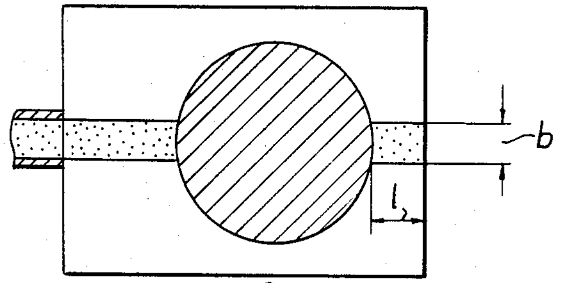
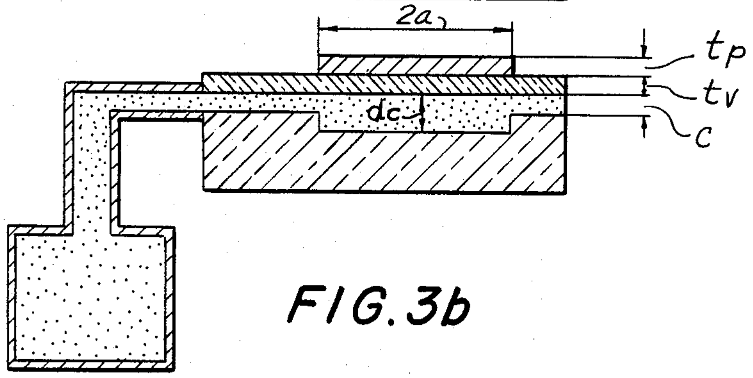
FIG. 3b
FIG. 4a
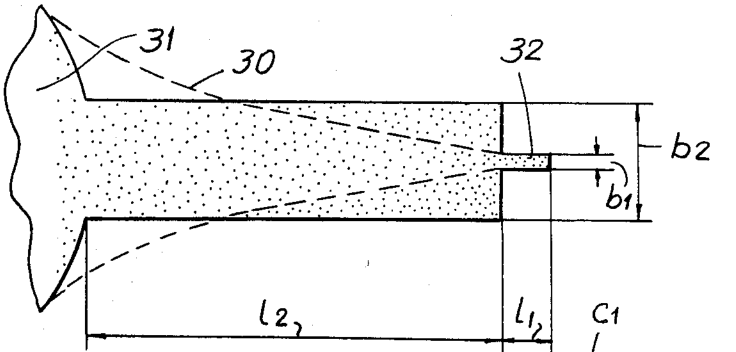
FIG. 4b
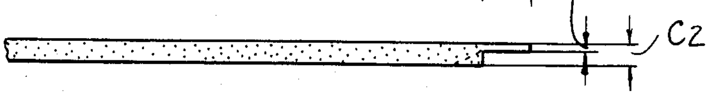

LOW VOLTAGE INK-JET PRINTHEAD

BACKGROUND OF THE INVENTION

The present invention relates to an ink-jet printer of the ink-on-demand type, and more particularly to a printing head for such a printer, which is driven by a reduced voltage.

Ink-jet printers of the ink-on-demand type include a piezoelectric element which is deformable upon application of a voltage so as to reduce the volume of a pressurization chamber for ejecting a jet of liquid ink from a nozzle which communicates with the pressurization chamber. Ink-jet printers have been attracting much attention since they consume a small amount of energy and can incorporate a multiplicity of nozzles. Although the structure for ejecting ink is quite simple, it has not been fully analyzed theoretically for the reasons that the ink ejection is effected under transient conditions, and it is difficult to measure the pressure and rate of flow of the ink because the printing head in the printer is small in size.

Various proposals have been made to determine the proper thickness of a vibration plate that contacts with the piezoelectric element to change the volume of the pressurization chamber. Most of the prior efforts base definition of the optimum thickness of the vibration plate only upon consideration of a vibratory system which is constituted jointly by the vibration plate and the piezoelectric element. According to Japanese Laid-Open Patent Publication No. 51-35231, for example, the neutral axes of the vibration plate and piezoelectric element should preferably lie in their median planes, and the thickness of the vibration plate is obtained from the equation:

($Et^2$) of the piezoelectric element = ($Et^2$) of the vibration plate;

where E is the modulus of elasticity and t is the thickness of the plate.

A study of the above equation indicates that when the modulus of elasticity of the piezoelectric element is substantially the same as that of the vibration plate, the thickness of the piezoelectric element is substantially the same as that of the vibration plate.

Another prior attempt at analysis relies on a finite-element method to determine the thickness of a vibration plate which allows the maximum displacement of the plate with respect to a given applied drive voltage. This approach also focuses on the vibratory system only, with no consideration given to the ink flow passage to find the optimum thickness of the vibration plate with respect thereto. At any rate, conventional ink-jet printers of the ink-on-demand type have incorporated piezoelectric elements having a thickness tp ranging from about 0.3 mm to about 0.7 mm, and a vibration plate having a thickness tv which is substantially the same as the thickness tp of the piezoelectric element. The ink-jet printer head as disclosed in the Laid-Open Publication No. 51-35231 requires a relatively high drive voltage of 130 V, but other known ink-jet printers use a lower drive voltage, which, however, still equals several tens of volts or higher. Portable ink-jet printers powered by ordinary electric cells therefore have a voltage booster circuit which is of a high boosting ratio and hence of lower efficiency. This results in a failure to take full advantage of the low energy consumption offered by ink-jet printers.

What is needed is an ink-jet printing head which is driven at lower voltages in order to eliminate a voltage booster circuit, and assures safe operation and has high efficiency.

SUMMARY OF THE INVENTION

Generally speaking in accordance with the invention, an ink-jet printer head operating effectively with low driving voltage is provided. The ink jet printer head comprises a piezoelectric element, a pressurization chamber coupled to the piezoelectric element for containing ink therein, and a nozzle communicating with the pressurization chamber, the piezoelectric element being deformable upon application of a drive voltage V to change the volume of said pressurization chamber for ejecting ink from the nozzle. A vibratory system, including the piezoelectric element, has an acoustic capacitance Co selected with respect to a flow passage system defined partly by the nozzle so as to minimize the drive voltage V, expressed by:

$$V = \sqrt{\frac{2\psi^2 Co}{K^2 cp}}$$

$$\psi = \frac{VmAm_3C\sqrt{E^2 + D^2}}{Co\,\exp[-D \cdot \arctan(E/D)/E]} \text{ and}$$

ψ is pressure imposed by the piezoelectric element; K is a proportional constant; cp is electric capacitance of the piezoelectric element; Vm is speed of ejection of the ink; A is the cross-sectional area of the nozzle; $m_3$ is fluid inertance of an ink ejection passage including the nozzle and a flow passage interconnecting the pressurization chamber and the nozzle; C is acoustic capacitance taking compressibility in the pressure chamber into account; D is the damping coefficient, and e is angular frequency.

Accordingly, it is an object of the present invention to provide an improved ink-jet printer head which can be driven with reduced voltage and hence consumes a reduced amount of energy.

Another object of the present invention is to provide an improved ink-jet printer head which will operate with increased safety.

Still another object of the present invention is to provide an improved ink-jet printer head having no voltage booster circuit, which as a result is less costly to manufacture, and smaller in size.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1(*b*) is a schematic cross-sectional view of a printing head;

FIGS. 3(*a*) and 3(*b*) are plan and cross-sectional views, respectively, of a printing head, illustrating various dimensional constants thereof;

FIGS. 4(*a*) and 4(*b*) are enlarged plan and side elevational views, respectively, of a nozzle of a printing head;

FIG. 5(*b*) is a graph showing a calculated vibration waveform of a piezoelectrical element plotted against time:

DESCRIPTION OF THE PREFERRED EMBODIMENTS

The inventors of the present invention have analyzed equivalent electric circuit models for printing heads for ink-jet printers and, as a result, have found that the voltage for driving such printing heads can be lowered by selecting the vibratory system so as to be best suited for the ink flow passage system.

Figures 12A, 12B, 12C, 12D:
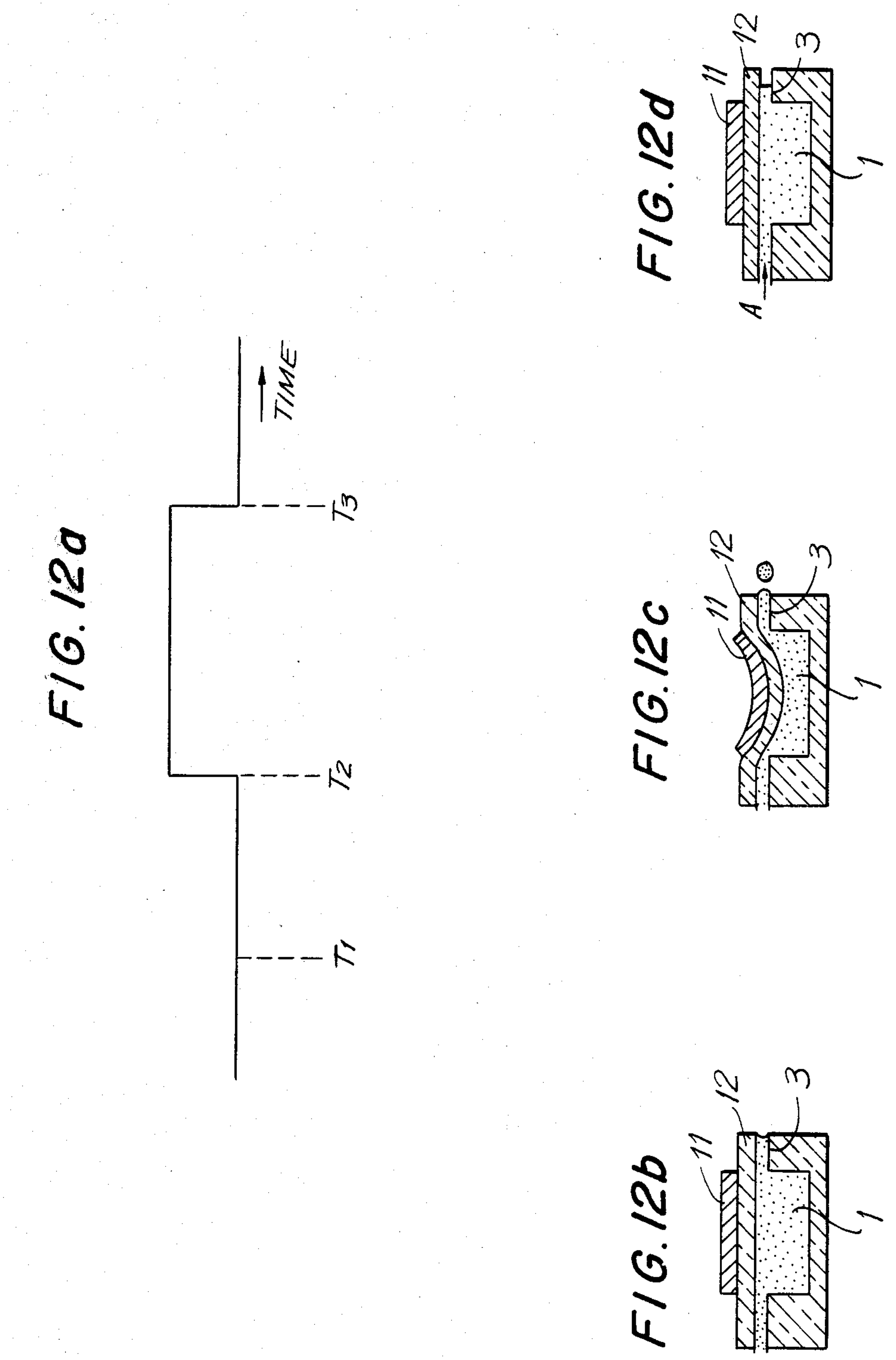
FIGS. 12(*a*)-(*d*) illustrate fundamental operation of a printing head in accordance with the present invention.

FIGS. 12(*a*)-(*d*) illustrate the fundamental operation of the printing head according to the present invention. FIG. 12(*a*) is a chart showing a waveform of a voltage signal applied to a piezoelectric element 11 and FIGS. 12(*b*)-(*d*) show the configuration of the printing head at time $T_1$, $T_2$ and $T_3$, respectively. At the time $T_1$, as shown in FIG. 12(*b*), no voltage signal is applied to the piezoelectric element 11 so that the pressurization chamber 1 is filled with ink and keeps a predetermined volume without distorting the vibration plate 12.

Upon applying the voltage signal to the piezoelectric element 11 at the time $T_2$, the vibration plate 12 bends inward, whereby volume of the pressurization chamber 1 is suddenly decreased so as to eject an amount of ink as an ink droplet from a nozzle. As a result a dot is formed on the recording sheet. At the time $T_3$, the voltage signal applied to the piezoelectric element 11 is removed to thereby return the piezoelectric element 11, vibration plate 12 and the volume of the pressurization chamber 1 to the original condition, whereupon the ink from an ink tank (not shown) is drawn into the pressurization chamber 1 in the direction of the arrow A. Thus, ink is supplied after ejection of a droplet.

Figure 1A:
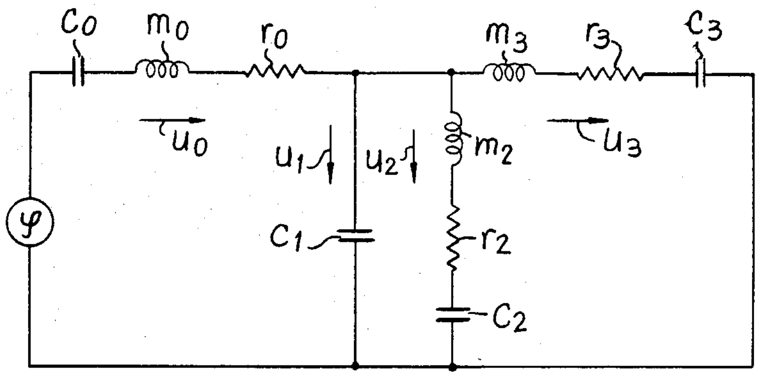
FIG. 1(*a*) is a diagram of an equivalent electrical circuit of a printing head, illustrating principles of the present invention.
Figure 1B:
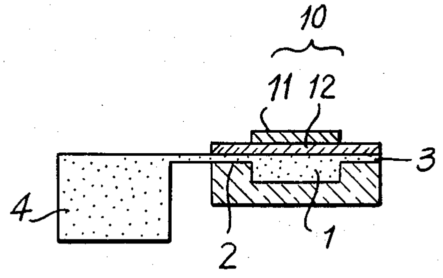
Figure 2:
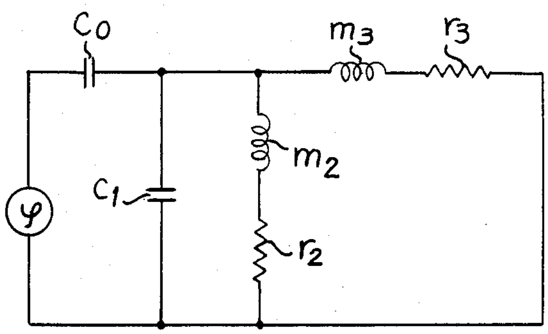
FIG. 2 is a diagram of a simplified equivalent electrical circuit of the printing head of FIG. 1(*b*)

FIG. 1*a* shows an equivalent electric circuit of a printing head, including inertance m, acoustic capacitance C, and acoustic resistances r. FIG. 1*b* illustrates such a printing head having a vibratory system 10 comprising a piezoelectric element 11 and a vibration plate 12, a pressurization chamber 1 defined below the vibratory system 10, an ink supply passage 2, an ink ejection passage 3 including a nozzle and a flow passage interconnecting the pressurization chamber 1 and the nozzle, and an ink tank 4 from which ink can be supplied into the pressurization chamber 1 through an ink supply passage 2. The subscripts to the parameters shown in FIG. 1*a* are indicative of or correspond to the parts illustrated in FIG. 1*b*, except that $C_2$ denotes the acoustic capacitance of the ink tank 4, $C_3$ the surface tension due to the nozzle and regarded as an acoustic capacitance, and the subscript "O" indicates the vibratory system 10. Units and symbols used are as follows:

$\psi$ pressure: $N/m^2$; u volume velocity:$m^2/S$; m inertance: $Kg/m^4$; C acoustic capacitance: $m^5/N$; r acoustic resistance: $Ns/m^5$. Actual calculation of the parameters shows that the parameters $m_0$, $r_0$, $C_2$, and $C_3$ are negligible, and the equivalent circuit of FIG. 1*a* can thus be reduced to the simplified equivalent circuit illustrated in FIG. 2. Assuming that $m_2=km_3$ and $r_2=kr_3$, where k is a proportional constant, the pressure $\psi$ is a step function. Also assume that Damping coefficient:

$$D=r_3/2m_3 \quad \ldots (1)$$

$$\text{Angular frequency: } E=\sqrt{\frac{(1+1/k)}{m_3C}-D^2} \quad (2)$$

a damping oscillation results which may be espressed by:

$$U_3=\frac{\psi Co}{m_3CE}\exp(-Dt)\sin Et \quad (3)$$

where $$C=C_0+C_1 \quad \ldots (4)$$

From equation (3), the pressure $\psi$ required can be expressed by:

$$\psi=\frac{VmAm_3C\sqrt{E^2+D^2}}{Co\exp(-Dtm)} \quad (5)$$

where Vm is required velocity; A is a cross-section area of the nozzle, and $$tm=\frac{\arctan(E/D)}{E} \quad (6)$$

The volume q of ink droplet is represented by:

$$q=\frac{\psi Co}{\left(1+\frac{1}{k}\right)} \quad (7)$$

the drive voltage V can be expressed as follows:

$$V=\sqrt{\frac{2\psi^2Co}{K^2cp}} \quad (8)$$

where cp is the electrical capacitance of the piezoelectric element, and K is a proportional constant which ranges from 0.1 to 0.3 as determined by experiment. The capacitance cp may be expressed as in the following equation:

$$cp=\epsilon Sp/tp \quad \ldots (9)$$

where $\epsilon$ is the dielectric constant; Sp is the area of the piezoelectric element, and tp is the thickness of the piezoelectric element.

Where the piezoelectric element is provided in the shape of a disc, the various parameters can be expressed as follows:

$$Co = \frac{\pi a^6}{K_1 Ep \cdot tp^3 + K_2 Ev \cdot tv^3} \quad (10)$$

$$C_1 = \frac{\pi a^2 dc}{Vs^2 \rho} \quad (11)$$

$$r = \frac{32 \eta l}{S d^2} \quad (12)$$

and $$m = \frac{l\rho}{S} \quad (13)$$

where Ep is the modulus of longitudinal elasticity of the piezoelectric element; Ev is the modulus of longitudinal elasticity of the vibration plate; $K_1$ and $K_2$ are constants; a is the radius of the piezoelectric element; tp is the thickness of the piezoelectric element; tv is the thickness of the vibration plate; dc is the depth of the pressurization chamber; Vs is the speed of sound in ink; $\rho$ is the ink density; $\eta$ is the ink viscosity, $l$ is length of the passage; S is the cross-sectional area of the passage, and d is the diameter of the passage.

Where the passage is of a rectangular cross-section, the equivalent diameter $d \cong 2S/(b+c)$ may be used, where b and c are the sides of the cross-section of the passage.

The above parameters are illustrated in FIGS. 3$a$ and 3$b$ for the rectangular cross-section.

An example is now given, which has been defined by the foregoing equations. FIGS. 4$a$ and 4$b$ illustrate the nozzle structure of a printing head fabricated of glass, by etching. A tapering flow passage 30 extending from a pressurization chamber 31 to a nozzle 32 is approximated by a straight flow passage indicated by the solid lines, and the equations (12) and (13) are used to derive parameters $m_3$ and $r_3$ when $b_1=80\mu$, $c_1=30\ \mu$, $l_1=250\mu$, $b_2=300\mu$, $c_2=100\mu$, $l_2=2$mm, $\eta=1.8$ centipoise, and $\rho=1{,}000$ Kg/m$^3$, as follows: ($\mu$ is microns)

$$m_3 = 1.8\times10^8 \text{Kg/m}^4$$

$$r_3 = 3.3\times10^{12} \text{Ns/m}^5$$

For more accurate definition, an integration should be made along the flow passage, or the latter should be divided into smaller segments to obtain the parameters m and r, respectively, for the divided parts, and those parameters should be added together.

Figure 5A:
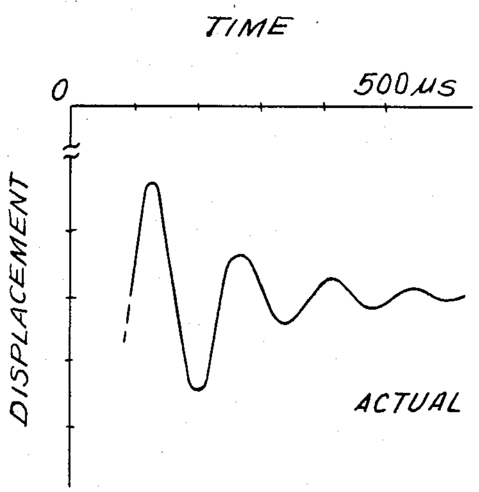
FIG. 5(*a*) is a graph showing an actual vibration waveform of a piezoelectrical element.
Figure 5B:
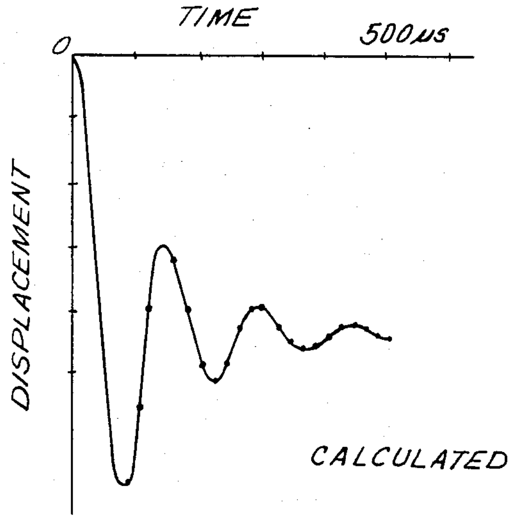

FIGS. 5$a$ and 5$b$ illustrate an actual waveform of displacement versus time and a waveform plotted by calculation, respectively, of a piezoelectric element formed of a PZT, for a printing head. The parameters and constants are as follows: $a=1.25$mm; $k=1.3$; $r_3=4\times10^{12}$Ns/m$^5$; $m_3=2.5\times10^8$Kg/m$^4$; $tp=tv=0.15$mm; $c_1=0.22=10^{-18}$m$^5$/N and $Co=3.45\times10^{-18}$m$^5$/N. Although the actual and theoretical vibration waveforms are not in full agreement with each other since, for example, the actual period of vibration is about 140 microseconds whereas the period of vibration defined by calculation is about 146 microseconds, comparison of both curves indicates that the actual vibratory movement of the piezoelectric element can be accounted for to a considerable degree by the above theoretical analysis. No measurement has been made of any displacement of the piezoelectric element prior to 100 microseconds for the vibratory waveform shown in FIG. 5$a$ because of an incompleteness in the measuring process. The vertical axes of the graphs of FIGS. 5$a$ and 5$b$ do not correspond to each other.

A printing head in accordance with the present invention is now described. The head is designed using the foregoing equations, so as to be drivable at a low voltage.

Figure 6:
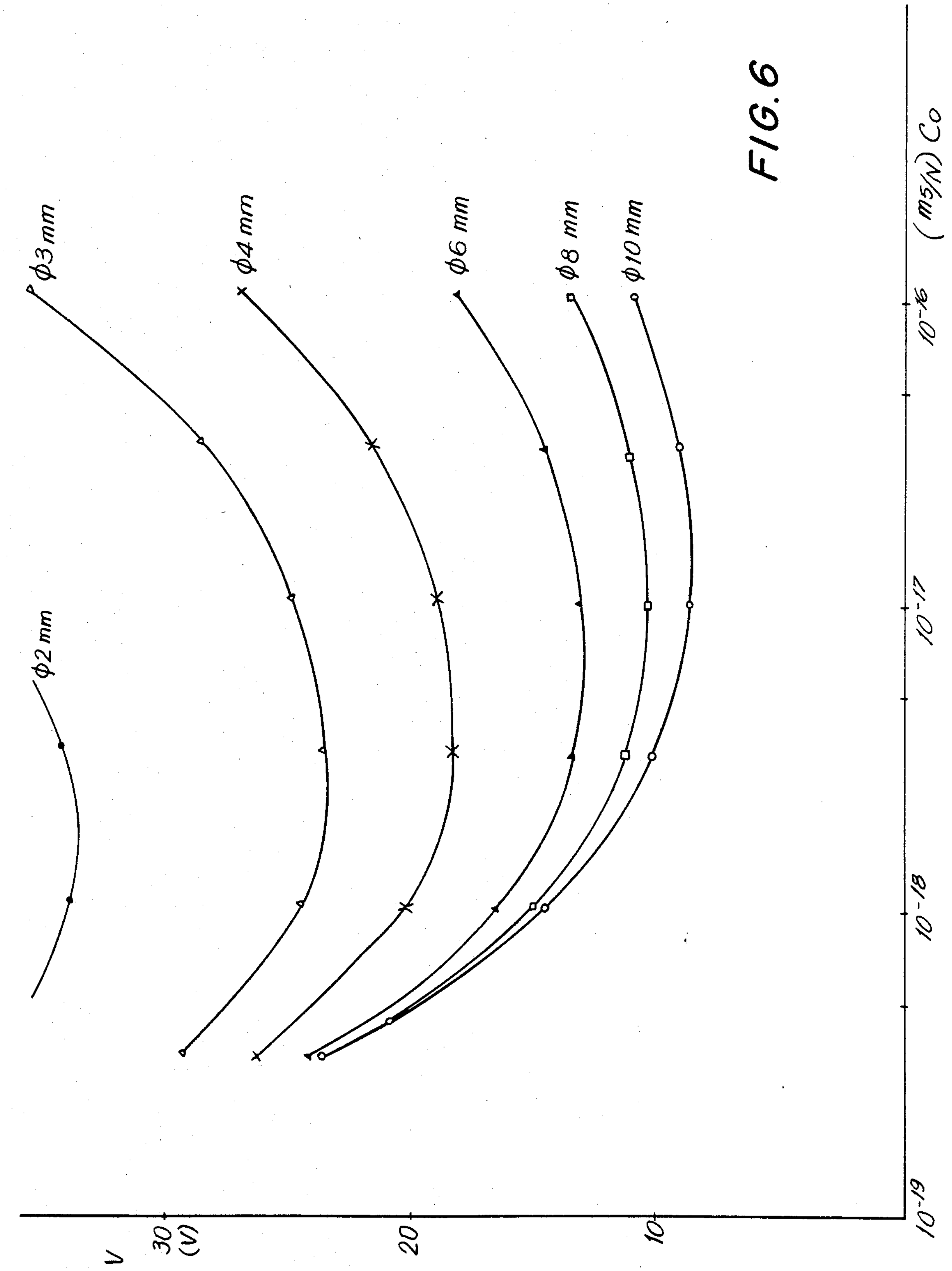
FIGS. 6 through 8 are curves of calculated driving voltages versus different acoustic capacitances of a vibratory system.
Figure 7:
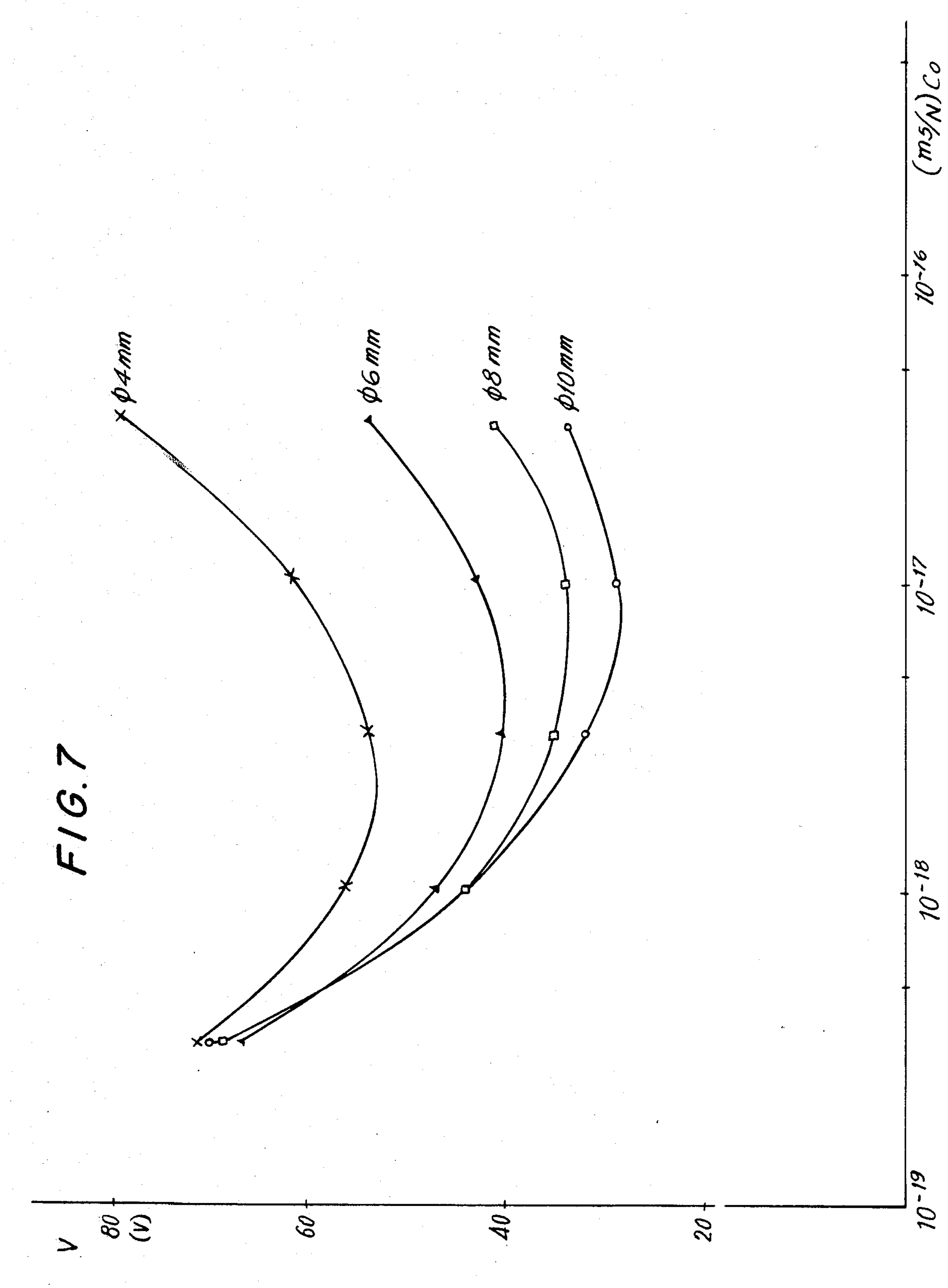

FIGS. 6 and 7 show calculated variations in the drive voltage which result when the acoustic capacitance Co of the vibratory system is changed, while the flow passage system, the thickness of the piezoelectric element, the depth of the pressurization chamber, and the speed of ejection of ink remain constant in the equation (1) through (8). The main parameters and constants are as follows: $\eta=1.8$ cp; dc=0.1 mm; $d=50\ \mu$; tp=0.15 mm; =5 m/s; K=0.24; $\epsilon=2{,}070\times8.85\times10^{-12}$F/m; and k=1. FIG. 6 illustrates data obtained when the ink ejection passage has the dimensions $d=50\mu$ and 32 $100\mu$, and hence $m_3 \cong 5\times10^7$ Kg/m$^4$ and $r_3 \cong 1\times10^{12}$Ns/m$^5$. FIG. 7 shows data obtained when the ink ejection passage is composed of series-connected passageways, the nozzle having dimensions $d=50\ \mu$ and $l_1=500\ \mu$ and the flow passage with $d=500\ \mu$ and $l_2=10$ mm, and $m_3 \cong 3\times10^8$ Kg/m$^4$ and $r_3 \cong 6\times10^{12}$ Ns/m$^5$.

A review of the graphs of FIGS. 6 and 7 shows that for a given diameter $\phi$ of the piezoelectric element, there is an optimum acoustic capacitance Co which minimizes the drive voltage V. Therefore, where the flow passage system and the piezoelectric element are given, the drive voltage can be minimized by selecting the thickness of the vibration plate and the optimum acoustic capacitance Co. A comparison between FIGS. 6 and 7 indicates that in general, the shorter the ink ejection passage and the smaller the inertance m and acoustic resistance r, the lower the drive voltage.

To meet UL safety requirements for a peak value of 42.4 V, the drive voltage is selected so as to be 35 V or less by having Co in the range of $6\times10^{-19}\text{m}^5/\text{N} \leqq Co \leqq 4\times10^{-18}\text{m}^5/\text{N}$ for a piezoelectric element 2 mm in diameter, with the ink ejection passage length being $l=100\mu$ a shown in FIG. 6. Where a regulated power supply is to be used, a drive voltage of 24 V or lower is preferred and a 3 mm diameter piezoelectric element, with Co in the range of from $10^{31\ 18}$ to $5\times10^{-18}$m$^5$/N should be used. The printing head can be directly driven by a number of electric cells connected in series. In actual practice, however, six dry cells at most are desirable, or manganese dry cells producing a total of 9 V or less should preferably be used to drive the printing head. To this end, the 10 mm diameter piezoelectric element in FIG. 6 with $Co \cong 10^{-17}$m$^5$/N should be employed.

Where the resistance of the flow passage is larger as in FIG. 7, the drive voltage V becomes higher than that of FIG. 6 even when the optimum values of Co are selected. Under the condition where the drive voltage is required to be 35 V or below, for example, the 8 mm diameter piezoelectric element should have a value of Co selected in the range of $3\times10^{-18}\text{m}^5/\text{N} \leqq Co \leqq 2\times10^{-17}\text{m}^5/\text{N}$, and the 10 mm diameter piezoelectric element should have $Co \cong 10^{-17}$m$^5$/N for a lowered drive voltage.

Although in the foregoing description the drive voltages have been derived under the condition that ink ejection velocity be equal to 5 m/s, lower drive voltages may be used where the ink ejection is at a lower velocity of 3 m/s. However, the quality of the printed characters becomes poor when the ink is ejected at a speed of 2 m/s or less.

The drive voltage required is governed not only by the speed of ejection of the ink, but also by the volume of ink liquid, which is represented by equation (7). In practice, an optimum acoustic capacitance should first be determined on the basis of the ink ejection speed selected, and then should be modified with the volume of the ink/droplet taken into account. As an example, while the optimum acoustic capacitance Co is about $7\times10^{-18}m^5/N$ for the piezoelectric element of 6 mm diameter of FIG. 6, the acoustic capacitance may be selected in the range of $1.8\times10^{-18}m^5/N\leqq Co\leqq3\times10^{-17}m^5/N$ if approximately a 10% increase in the drive voltage is permissible. The diameter of the ink droplet may at this time range from 70μ to 100μ through it is about 80μ with $Co=7\times10^{-18}m^5/N$.

The smaller the thickness tp of the piezoelectric element, the great the acoustic capacitance thereof, and hence the lower the drive voltage as defined by the equation (8) becomes. The lower limit for the thickness tp of the piezoelectric element is determined by various factors such as the possibility of cracking during formation and assembly of the piezoelectric element. A piezoelectric element of tp≅0.15 mm as used in FIGS. 6 and 7 is acceptable in general, but piezoelectric elements having thickness down to 50μ may be used if handled with care. For lowered drive voltages, the thickness tp can be made smaller by depositing a thin film of PZT on a vibration plate.

Figure 8:
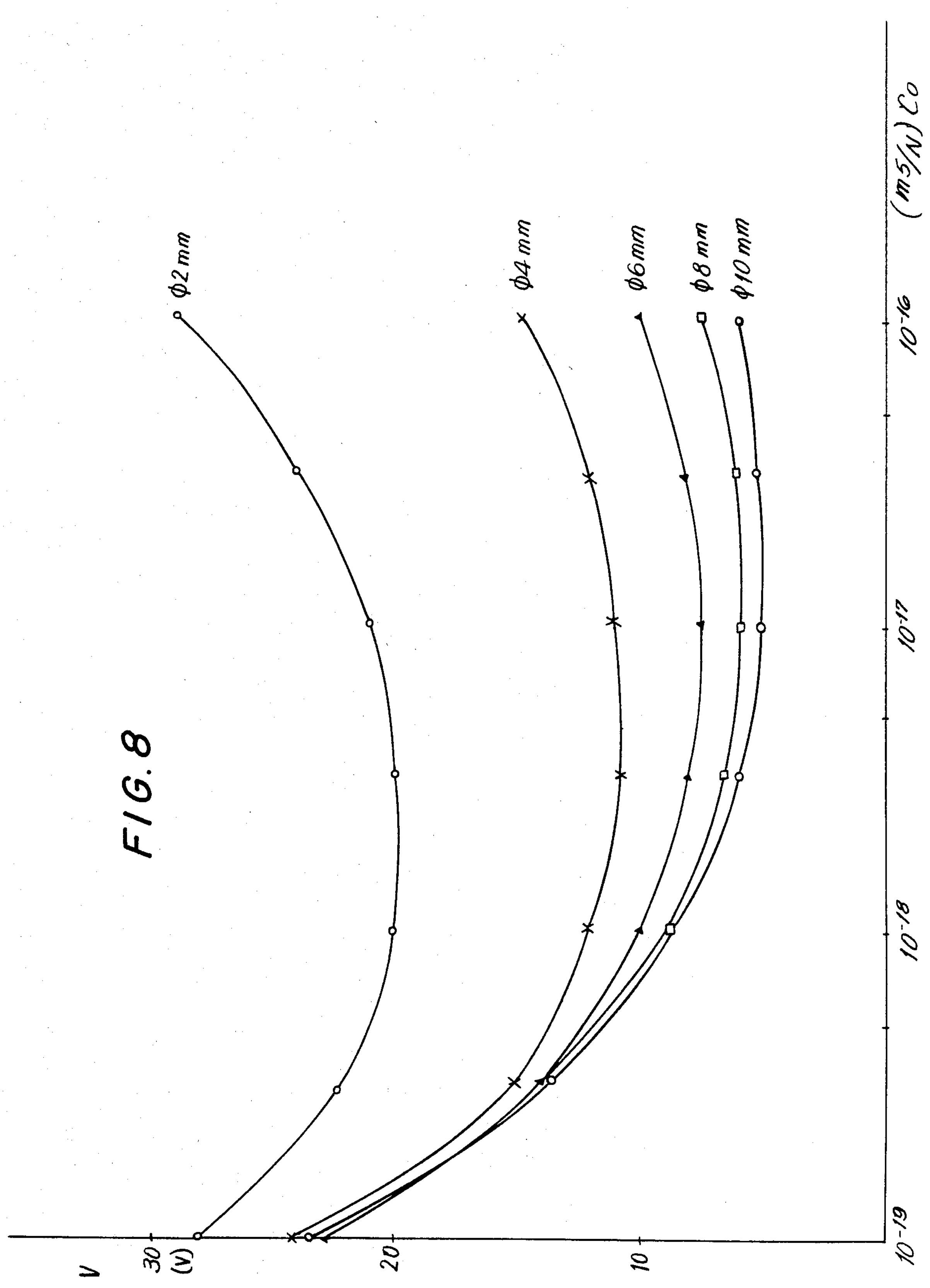

FIG. 8 illustrates data on piezoelectric elements drivable by much lower voltages, with tp=0.1 mm; length of the nozzle $l_1=50\mu$; length of the flow passage $l_2=0$; $m_3=2.6\times10^7$ Kg/m$^4$, and $r_3=6\times10^{11}$ Ns/m$^5$. A 2 mm diameter piezoelectric element can be driven by a voltage which approximates 20 V by properly selecting Co, and piezoelectric elements of 6 mm, 8 mm and 10 mm can be driven directly by electric cells in the vicinity of $Co\cong10^{-17}m^5/N$. The length l of the nozzle should not be too small since nozzles of too short a length render themselves irregular in shape during the fabricating process and adversely affect the operating characteristics of the printing heads. Thus, nozzles having a length less than 50μ are not preferred from the standpoint of mass production of printing heads. As described above, according to FIGS. 6, 7 and 8, when the piezoelectric element has 6 mm or less diameter, if the diameter is increased, the drive voltage is decreased at a larger rate. However, in the case of the piezoelectric element having more than 6 mm diameter, the increment of the diameter is accompanied with the decrease of the drive voltage at a smaller rate.

Figure 9:
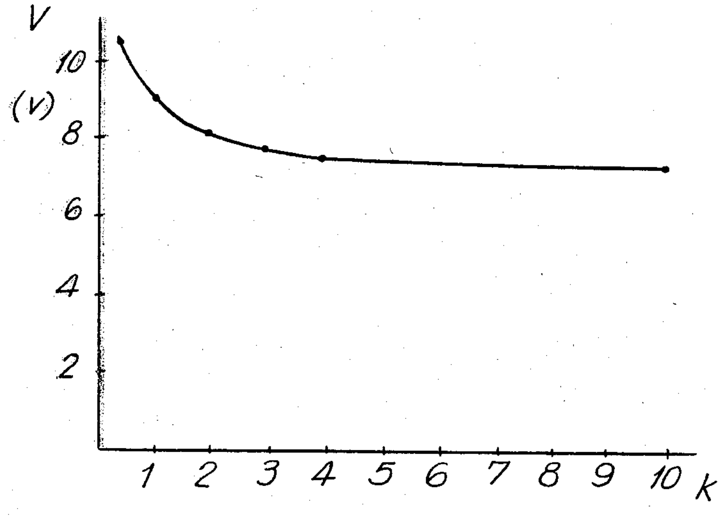
FIG. 9 is a graph showing calculated driving voltages versus impedance ratios.

The larger the ratio k between impedances on the supply and ejection sides, as by constricting the supply passage, the lower the drive voltage, since the amount of ink which is forced backwards when flexing the piezoelectric element becomes smaller. However, limiting the supply passage results in a reduced supply of ink, causing the diameter of ink droplets as ejected to be smaller and lowering the responsiveness of the printing head. Therefore, increasing the ratio k adversely affects the responsiveness of the printing head. FIG. 9 illustrates the change of the drive voltage with the change of the impedance ratio k with length of the nozzle l=100μ; thickness of the vibration plate tp=0.1 mm, and a 0.4 mm diameter piezoelectric element. A study of FIG. 9 shows that beyond a point, drive voltage is not lowered even if the ratio k is increased. Thus, the ratio k should preferably be in the range of approximately 0.5 to 3.0 to maintain the required degree of responsiveness. Additionally, the impedance ratio k is determined by the inertance ratio expressed by $k'=m_2/m_3$ and the acoustic resistance ratio expressed by $k''=r_2/r_3$. In the case of k'=k", k=k' is permitted. In the case of k'≠k", k=(k'+k")/2 is applied to the equation (2) for obtaining the angular frequency E. Moreover, $$k = \frac{r_2 + m_2 \cdot E}{r_3 + m_3 \cdot E} \tag{14}$$

is applied to the equation (2) for obtaining the angular frequency E. Then, the value E thus obtained is applied to the equation (14). After the repetition of these works, if the values of k are converged to a certain range, this value is determined as k.

The larger the ratio k between impedances on the supply and ejection sides, as by constricting the supply passage, the lower the drive voltage, since the amount of ink which is forced backwards when flexing the piezoelectric element becomes smaller. However, limiting the supply passage results in a reduced supply of ink, causing the diameter of ink droplets as ejected to be smaller and lowering the responsiveness of the printing head. Therefore, increasing the ratio k adversely affects the responsiveness of the printing head. FIG. 9 illustrates the change of the drive voltage with the change of the impedance ratio k with length of the ink ejection passage l=100μ; thickness of the piezoelectric element tp=0.1 mm, and a 0.4 mm diameter piezoelectric element. A study of FIG. 9 shows that beyond a point, drive voltage is not lowered even if the ratio k is increased. Thus, the ratio k should preferably be in the range of approximately 0.5 to 3.0 to maintain the required degree of responsiveness.

By definition, the acoustic capacitance C, the pressure ψ, and the volume variation q have the relationship ψ=q/C. The acoustic capacitance Co of the vibratory system according to the present invention is defined by the ratio of the volume variation to the pressure when the pressurization chamber is subjected to pressure. The approximate expression (10) given above for Co for a disc-shaped piezoelectric element varies with the means by which the vibration plate is circumferentially fixed, the properties and thickness of the adhesive by which the vibration plate and the piezoelectric element are bonded to one another, and the configuration of the pressurization chamber. For example, the following equation $$Co = \frac{\pi a^6}{k_1 Ep(tp + K_2 tv)} \tag{10'}$$

better matches experimental data in certain instances. In applicants experiments, $K_1\cong3$ and $K_2$ is expressed by $K_2\cong\sqrt{Ev/Ep}$. Accordingly, in the case that a vibration plate is made of plastic having approximately $3\times10^9$ N/m$^2$ in elastic rate, $K_2\cong0.4$. In the case that a vibration plate is made of glass having $6\times10^{10}$ N/m$^2$ in elastic rate, which value is almost the same as that of the piezoelectric element, $K_2 \cong 1$. For a stricter definition, each printing head can be analyzed by a finite-element method.

Figure 10:
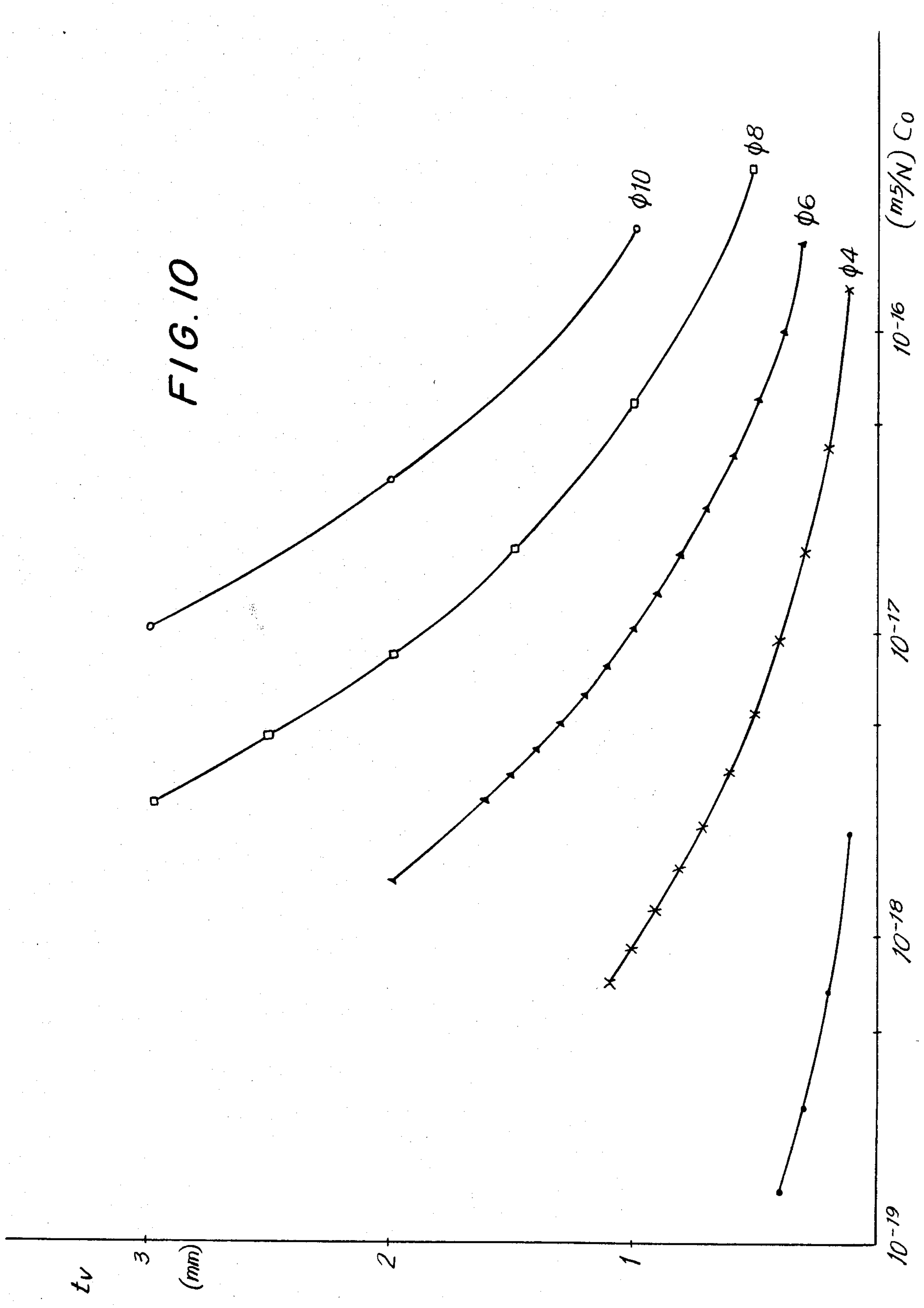
FIG. 10 is a graph showing the relationship between the thickness of the vibration plate and the acoustic capacitance thereof.

FIG. 10 shows the relationship, defined using the equation (10)', between the thickness tv of a glass vibration plate and the acoustic capacitance Co where the piezoelectric elements used have a thickness tp=0.1 mm. According to FIG. 8, if $1\times10^{-18} \leqq Co \leqq 3\times10^{-17}$ and preferably $Co=5\times10^{-18}$ in respect of 4 mm diameter piezoelectric element, the piezoelectric element is drivable by low voltage. Similarly, if $1\times10^{-18} \leqq Co=1\times10^{-16}$ and preferably $Co=1\times10^{-17}$ in respect of 6, 8 or 10 mm diameter piezoelectric element, the piezoelectric elements are also drivable by low voltages. Accordingly, seeing FIG. 10 to get values of tv corresponding to above-mentioned Co respectively, in respect of the 4 mm diameter piezoelectric element 0.2 mm $\leqq$tv $\leqq$1 mm and preferably tv=0.4 mm. In respect of the 6 mm diameter piezoelectric element, tv$\geqq$0.4 mm and preferably tv=1 mm. In respect of the 8 mm diameter piezoelectric element, tv $\geqq$0.8 mm and preferably tv=1.7 mm. In respect of the 10 mm diameter piezoelectric element, tv$\geqq$1.3 mm and preferably tv=2.9 mm. These values of tv are more than twice as compared with the conventional value (tv$\cong$*tp*=)0.1 mm, particularly preferable values of tv are 4 to 29 times of 0.1 mm. Namely, if the thickness tv of the vibration plate is greatly increased with the increment of the diameter of the piezoelectric element, it will be possible to provide an ink-jet printer comprising an ink-jet printer and head drivable by much lower voltage. A vibration plate made of plastic has an increased thickness tv for a given acoustic capacitance Co.

The printing head of the present invention is advantageous in that it can be driven by a low voltage by selecting a vibratory system which is best suited for the flow passage system used, and the printing head will operate more safely. The efficiency of a voltage booster circuit, if employed, is increased by operating at lower voltages. The driver for energizing the printing head can be less expensive to construct. By reducing the flow passage impedance and the thickness of the piezoelectric element and increasing the diameter of the piezoelectric element, the printing head can be directly driven by electric cells without using a voltage booster circuit such as an electromagnetic transformer or a piezoelectric transformer, with the result that the printing head will consume less energy with increased efficiency, and may be made smaller in size and less costly to manufacture.

While in the foregoing embodiments a disc-shaped pressurization chamber is shown and described, printing heads of other shapes may be constructed on the same principles by modifying the equations (10), (11), and others. A pressurization chamber which is too slender has a reduced acoustic capacitance Co, which requires a larger drive voltage. A rectangular pressurization chamber should be dimensioned such that the ratio of the longer side to the shorter side is 2 or less. The piezoelectric element may be fabricated of PZT or other suitable materials. The vibratory system may be constructed of a plurality of piezoelectric elements such as bimorph cell, to lower the drive voltage.

Figure 11:
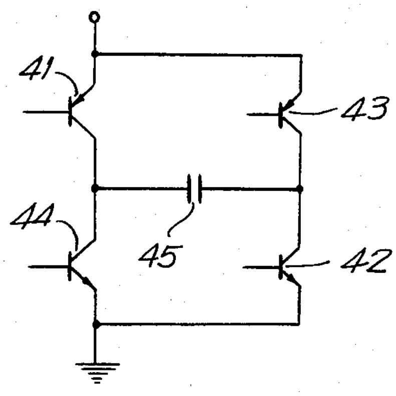
FIG. 11 is a diagram of an electronic circuit for driving an ink-jet head in accordance with the present invention.

As shown in FIG. 11, a piezoelectric element 45 may be charged in one direction by transistors 41, 42 and, during the printing operation, may be charged in the opposite direction by transistors 43, 44, so that the apparent drive voltage available doubles the voltage from the power supply. Stated otherwise, the driving arrangement as illustrated in FIG. 11 requires drive voltage sources which are half the voltage required by the foregoing embodiments.

In summarizing, the impedance of the flow passage system, the thickness of the piezoelectric element, the area of the piezoelectric element, and the ratio between impedances on the supply and ejection sides are related to one other. When the ink ejection passage impedance is large with other conditions remaining the same, it is necessary to increase the area of the piezoelectric element. Thus, these parameters are dependent on one another and cannot be optimally determined without regarding the other parameters. Limits for the parameters however are as follows: for the ink ejection passage impedance, $m_3 \leqq 5\times10^8$ Kg/m$^4$ and $r_3 \leqq 5\times10^{13}$ Ns/m$^5$; for the thickness of the piezoelectric element, tp$\leqq$0.3 mm; for the area of the piezoelectric element radius), a$\geqq$1 mm (where a is radius of the piezoelectric element), and for the impedance ratio, k$\geqq$0.3. Especially for lowered drive voltages, it is preferably that $m_3 \leqq 10^8$ Kg/m$^4$; $r_3 \leqq 2\times10^{12}$ Ns/m$^5$, tp$\leqq$0.15 mm; a $\geqq$2 mm; and k$\geqq$1. The smaller the inertance $m_3$, ink ejection passage resistance $r_3$ and thickness tp of the piezoelectric element, the lower the drive voltage required for printing heads having the same nozzle diameter. The larger the radius a of the piezoelectric element and the impedance ratio k, generally the smaller the drive voltage becomes (FIGS. 6–9).

The printing head in accordance with the invention can be driven by a low voltage by reducing the ink ejection passage impedance and the thickness of the piezoelectric element to the smallest possible degree, increasing the area of the piezoelectric element and the ratio between impedances of the supply and ejection sides to the largest suitable degree, and then selecting the acoustic capacitance of the vibratory system which is best suited for the flow passage system. Concretely, if vibration plate far thicker that has been used for creating the best condition of only the vibratory system is used to be joined with a thin piezoelectric element having a larger area, the drive voltage is reduced into less than 1/5 as compared with conventional ink-jet printers.

With the construction of a print head in accordance with the invention, drive voltage is lowered by selecting a vibratory system optimum for the flow passage used. The printing head is advantageous from the standpoint of energy consumption efficiency, safety, cost of manufacture and size. The printing head can be incorporated into various devices such as printers, plotters, facsimile and telecopiers, and is particularly suitable for use in portable printing devices powered by electric cells.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In an ink-jet printer head including a piezoelectric element having an electrical capacitance cp, a pressurization chamber coupled to said piezoelectric element for containing ink therein, and an ink ejection passage including a nozzle of cross-section A and a flow passage interconnecting said pressurization chamber and said nozzle, said ink ejection passage having fluid inertance $m_3$, said piezoelectric element being deformable upon application of a drive voltage V to change the volume of said pressurization chamber for ejecting ink from said nozzle, the improvement therein comprising:

a vibratory system including said piezoelectric element, said vibratory system having an acoustic capacitance Co;

a flow passage system including said ink ejection passage, said pressurization chamber and an ink supply passage for providing ink to said pressurization chamber, the physical and electrical interrelationships in said ink-jet printer head being represented by the equation $$V = \sqrt{\frac{2\psi^2 Co}{K^2 cp}}$$

$$\text{where } \psi = \frac{VmAm_3C\sqrt{E^2 + D^2}}{Co\exp[-D\cdot\arctan(E/D)/E]}$$

and $\psi$ is the pressure imposed by the piezoelectric element, K is a proportional constant, Vm is the desired ejection speed of ink from said nozzle, C is the acoustic capacitance taking into account compressibility in the pressure chamber, D is a damping coefficient, and E is angular frequency, said acoustic capacitance Co being selected to bring said driving voltage V nearly to a minimum.

2. An ink-jet printer head as claimed in claim 1, wherein said drive voltage V is provided by means of one or more storage cells.

3. An ink-jet printer head as claimed in claim 1, wherein said piezoelectric element is a circular disk and said pressurization chamber is a cylinder having a diameter approximating that of said disk.

4. An ink-jet printer head as claimed in claim 1, wherein said acoustic capacitance Co is selected to minimize said driving voltage V.

5. An ink-jet printer head as claimed in claim 2, wherein the diameter of said piezoelectric element is at a fixed selected value, said ink-jet printer head being dimensioned relative to said selected diameter, the acoustic capacitance Co resulting from said dimensioning providing said minimized drive voltage.

6. An ink-jet printer head as claimed in claim 1, wherein said piezoelectric element has a thickness not exceeding 0.3 mm and a radius not less than 1 mm, said flow inertance $m_3$ not exceeding $5\times10^8$ Kg/m$^4$ and an acoustic resistance $r_3$ not greater than $5\times10^{13}$ Ns/m$^5$, said ink supply passage having an inertance and acoustic resistance, the ratio of supply passage inertance to said ink ejection passage inertance $m_3$ being not less than 0.3 and the ratio of supply passage acoustic resistance to said nozzle acoustic resistance $r_3$ being not less than 0.3.

7. An ink-jet printer head as claimed in claim 5, wherein said piezoelectric element has a thickness not exceeding 0.3 mm and a radius not less than 1 mm, said flow inertance $m_3$ not exceeding $5\times10^8$ Kg/m$^4$ and an acoustic resistance $r_3$ not greater than $5\times10^{13}$ Ns/m$^5$, said ink supply passage having an inertance and acoustic resistance, the ratio of supply passage inertance to said ink ejection passage inertance $m_3$ being not less than 0.3 and the ratio of supply passage acoustic resistance to said nozzle acoustic resistance $r_3$ being not less than 0.3.

8. An ink-jet printer head comprising a pressurization chamber which is formed between first and second base plates one of which is a vibration plate, a nozzle for ejecting ink droplets, an ink ejection passage including said nozzle and a flow passage interconnecting said pressurization chamber and said nozzle, an ink supply passage communicating with said pressurization chamber and a vibratory system which comprises a piezoelectric element disposed on said vibration plate opposite to said pressurization chamber, said piezoelectric element being deformable to change the volume of said pressurization chamber so as to eject the ink from said nozzle, the thickness tv of said vibration plate being such that the fluid inertance $m_3$ of said ink ejection passage is given by the expression:

$$m_3 \leqq 3\times10^8 \text{Kg/m}^4;$$

the acoustic resistance $r_3$ of said ink ejection passage given by the expression:

$$r_3 \leqq 6\times10^{12} \text{Ns}/m^5;$$

the thickness tp of said piezoelectric element is given by the expression:

$$tp \leqq 0.2\text{mm};$$

the area sp of said piezoelectric element is given by the expression:

$$sp \geqq 1.2\times10^{-5}\text{m}^2;$$

the impedance ratio k of the impedance of said ink supply passage and that of said ink ejection passage is given by the expression:

$$k \geqq 0.5; \text{ and}$$

the acoustic capacitance Co of said vibratory system is given by the expression:

$$1\times10^{-18} m^5/N \leqq Co \leqq 1\times10^{-16}\text{m}^5/\text{N}.$$

9. An ink-jet printer head for projecting droplets of ink on demand comprising:

a pressurization chamber for containing ink therein, said pressurization chamber including at least one wall, said wall defining a vibration plate;

an ink supply passage for providing ink to said pressurization chamber;

an ink ejection passage including a nozzle for ejecting ink therefrom, a flow passage coupled between said pressurization chamber and said nozzle;

piezoelectric means operatively coupled to said vibration plate, said piezoelectric means altering the volume of said pressurization chamber in response to a drive signal to eject ink from said nozzle, said vibration plate and said piezoelectric means forming a vibratory system, said ink supply passage, said pressurization chamber and said ink ejection passage forming a flow passage system; and said ink ejection passage having the characteristics of a flow inertance $m_3$ and an acoustic resistance $r_3$, wherein $m_3$ and $r_3$ have values in the following ranges $$m_3 \leqq 5\times 10^8 Kg/m^4$$

$$r_3 \leqq 5\times 10^{13} Ns/m^5;$$

said piezoelectric means having the characteristic of thickness tp having a value in the range $$tp \leqq 0.3mm; \text{ and}$$

the ratio of the impedance in said ink supply passage to the impedance in said ejection passage is characterized as impedance ratio k, k having values in the range;

$$0.5 \leqq k \geqq 3.0.$$

10. The ink-jet printer head, as claimed in claim 9, wherein said ink ejection passage flow inertance $m_3$ and acoustic resistance $r_3$, have values in the following ranges $$m_3 \leqq 1\times 10^8 K3/m^4$$

$$r_3 \leqq 2\times 10^{12} Ns/m^5;$$

and said piezoelectric element means having thickness tp in the range $$tp \leqq 0.15mm.$$

11. The ink-jet printer head, as claimed in claim 9, wherein said flow inertance $m_3$ and said acoustic resistance $r_3$ have values in the following ranges $$m_3 \leqq 5\times 10^7 Kg/m^4$$

$$r_3 \leqq 1\times 10^{12} Ns/m^5;$$

and wherein said vibratory system is characterized with an acoustic capacitance designated $C_0$, having values in the range;

$$6\times 10^{-19} m^5/N \leqq C_0 \leqq 3\times 10^{-17} m^5/N.$$

12. The ink-jet printer head, as claimed in claim 9, wherein said piezoelectric means has a thickness tp in the range;

$$tp \leqq 50\mu,$$

said piezoelectric means being formed on said vibration plate utilizing a thin film technique.

13. An ink-jet printer head for projecting droplets of ink upon demand, comprising:

a pressurization chamber for containing ink therein, said pressurization chamber including at least one wall, said wall defining a vibration plate;

an ink supply passage for providing ink to said pressurization chamber;

an ink ejection passage including a nozzle for ejecting ink therefrom;

a flow passage coupled between said pressurization chamber and said nozzle;

a piezoelectric means operatively coupled to said vibration plate, said piezoelectric means altering the volume of said pressurization chamber in response to a drive signal to eject ink from said nozzle, said vibration plate and said piezoelectric means forming a vibratory system, said ink supply passage, pressurization chamber and ink ejection passage forming a flow passage system, and said ink ejection passage being characterized with a flow inertance $m_3$ and an acoustic resistance $r_3$ having values in the following ranges $$m_3 \leqq 3\times 10^7 Kg/m^4$$

$$r_3 \leqq 6\times 10^{11} Ns/m^5;$$

said piezoelectric means being characterized with a thickness tp and a diameter Dp having values in the following ranges;

$$tp \leqq 0.17mm;$$

$$Dp \leqq 2mm.$$

* * * * *